US008738496B2

(12) United States Patent
Titus et al.

(10) Patent No.: US 8,738,496 B2
(45) Date of Patent: *May 27, 2014

(54) PREPAID SHORT MESSAGING (75) Inventors: Mark Titus, Arnold, MD (US); Dara Ung, Odenton, MD (US); Carle S. Johnson, Jr., Annapolis, MD (US); Erik Wallace, Annapolis, MD (US); Phillip Geil, Clarksville, MD (US); Daniel Hronek, Annapolis, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/465,802

(22) Filed: May 7, 2012

(65) Prior Publication Data
US 2012/0230481 A1    Sep. 13, 2012

Related U.S. Application Data (63) Continuation of application No. 13/373,193, filed on Nov. 8, 2011, now Pat. No. 8,175,953, which is a continuation of application No. 12/292,606, filed on Nov. 21, 2008, now Pat. No. 8,060,429, which is a continuation of application No. 12/222,861, filed on Aug. 18, 2008, now Pat. No. 7,853,511, which is a continuation of application No. 09/790,979, filed on Feb. 23, 2001, now Pat. No. 7,428,510.

(60) Provisional application No. 60/185,053, filed on Feb. 25, 2000.

(51) Int. Cl.
*G06Q 40/00*    (2012.01)
*G06Q 40/02*    (2012.01)

(52) U.S. Cl.
USPC ............. 705/36 R; 705/42; 705/44; 705/35; 235/380

(58) Field of Classification Search
USPC ................. 705/36 R, 42, 44, 35; 235/380
See application file for complete search history.

(56) References Cited

U.S. PATENT DOCUMENTS

| 1,103,073 A | 7/1914 | O'Connel |
| 3,400,222 A | 9/1968 | Nigtingale |

(Continued)

FOREIGN PATENT DOCUMENTS

| FI | PCT/FI99/00935 | 11/1998 |
| NO | PCT/NO99/00178 | 6/1997 |

(Continued)

OTHER PUBLICATIONS

International Search Report received in PCT/US2012/062204 dated Jan. 9, 2013.

(Continued)

*Primary Examiner* — Harish T Dass
(74) *Attorney, Agent, or Firm* — William H. Bollman (57) ABSTRACT

A prepaid messaging solution that uses open networking standards and supports pre-payment of enhanced Internet messaging services. The prepaid messaging solution accurately determines if a subscriber has sufficient account balance to deliver a complete short message, prior to message delivery. Message delivery is prevented if insufficient funds are in the subscriber's account. A prepaid tariff engine, preferably extensible over a TCP/IP network, supports remote interaction with the SMSC and web chat servers to apply a real-time billing charge for each message. A service provider may create subscriber classes of service that define subscriber rates and/or tariffing plans used to apply real-time billing charges for sending/receiving messages. The prepaid short message tariff engine determines the appropriate message billing based upon, e.g., flat rate per message, character count, Time of Day, etc. The prepaid short messaging service preferably supports Internet web page access to subscriber's short messaging account balances and account status.

16 Claims, 4 Drawing Sheets

(56) References Cited

U.S. PATENT DOCUMENTS

| | | |
|---|---|---|
| 3,920,908 A | 11/1975 | Kraus |
| 4,310,726 A | 1/1982 | Asmuth |
| 4,399,330 A | 8/1983 | Kuenzel |
| 4,494,119 A | 1/1985 | Wimbush |
| 4,651,156 A | 3/1987 | Martinez |
| 4,680,785 A | 7/1987 | Akiyana et al. |
| 4,706,275 A | 11/1987 | Kamil |
| 4,725,719 A | 2/1988 | Oncken et al. |
| 4,756,020 A | 7/1988 | Fodale |
| 4,776,000 A | 10/1988 | Parienti |
| 4,776,003 A | 10/1988 | Harris |
| 4,776,033 A | 10/1988 | Scheinert |
| 4,831,647 A | 5/1989 | D'Avello et al. |
| 4,845,740 A | 7/1989 | Tokuyama et al. |
| 4,852,149 A | 7/1989 | Zwick |
| 4,852,155 A | 7/1989 | Barraud |
| 4,860,341 A | 8/1989 | D'Avello et al. |
| 4,891,638 A | 1/1990 | Davis |
| 4,891,650 A | 1/1990 | Sheffer |
| 4,901,340 A | 2/1990 | Parker et al. |
| 4,935,956 A | 6/1990 | Hellwarth et al. |
| 4,951,308 A | 8/1990 | Bishop et al. |
| 4,952,928 A | 8/1990 | Carroll |
| 5,003,585 A | 3/1991 | Richer |
| 5,014,206 A | 5/1991 | Scribner |
| 5,043,736 A | 8/1991 | Darnell et al. |
| 5,046,088 A | 9/1991 | Margulies |
| 5,055,851 A | 10/1991 | Sheffer et al. |
| 5,063,588 A | 11/1991 | Patsiokas et al. |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,103,449 A | 4/1992 | Jolissaint |
| 5,119,104 A | 6/1992 | Heller |
| 5,127,040 A | 6/1992 | D'Avello et al. |
| 5,128,938 A | 7/1992 | Borras |
| 5,138,648 A | 8/1992 | Palomeque et al. |
| 5,138,650 A | 8/1992 | Stahl et al. |
| 5,144,283 A | 9/1992 | Arens et al. |
| 5,144,649 A | 9/1992 | Zicker et al. |
| 5,159,625 A | 10/1992 | Zicker |
| 5,161,180 A | 11/1992 | Chavous |
| 5,177,478 A | 1/1993 | Wagai et al. |
| 5,187,710 A | 2/1993 | Chau et al. |
| 5,193,215 A | 3/1993 | Olmer |
| 5,208,756 A | 5/1993 | Song |
| 5,214,789 A | 5/1993 | George |
| 5,216,703 A | 6/1993 | Roy |
| 5,218,367 A | 6/1993 | Sheffer et al. |
| 5,220,593 A | 6/1993 | Zicker |
| 5,223,844 A | 6/1993 | Mansell |
| 5,233,642 A | 8/1993 | Renton |
| 5,235,630 A | 8/1993 | Moody |
| 5,239,570 A | 8/1993 | Koster |
| 5,265,155 A | 11/1993 | Castro |
| 5,266,944 A | 11/1993 | Carroll et al. |
| 5,274,802 A | 12/1993 | Altine |
| 5,276,444 A | 1/1994 | McNair |
| 5,289,527 A | 2/1994 | Tiedemann |
| 5,291,543 A | 3/1994 | Freese et al. |
| 5,293,642 A | 3/1994 | Lo |
| 5,297,189 A | 3/1994 | Chabernaud |
| 5,299,132 A | 3/1994 | Wortham |
| 5,301,223 A | 4/1994 | Amadon et al. |
| 5,301,234 A | 4/1994 | Mazziotto et al. |
| 5,309,501 A | 5/1994 | Kozik et al. |
| 5,311,572 A | 5/1994 | Frieder et al. |
| 5,321,735 A | 6/1994 | Breeden |
| 5,325,302 A | 6/1994 | Izidon |
| 5,325,418 A | 6/1994 | McGregor et al. |
| 5,327,144 A | 7/1994 | Stilp et al. |
| 5,329,578 A | 7/1994 | Brennan et al. |
| 5,334,974 A | 8/1994 | Simms |
| 5,339,352 A | 8/1994 | Armstrong et al. |
| 5,341,414 A | 8/1994 | Popke |
| 5,343,493 A | 8/1994 | Karimullah |
| 5,347,568 A | 9/1994 | Moody |
| 5,351,235 A | 9/1994 | Lahtinen |
| 5,353,335 A | 10/1994 | D'Urso |
| 5,359,182 A | 10/1994 | Schilling |
| 5,359,642 A | 10/1994 | Castro |
| 5,359,643 A | 10/1994 | Gammino |
| 5,361,212 A | 11/1994 | Class |
| 5,363,425 A | 11/1994 | Mufti |
| 5,369,699 A | 11/1994 | Page et al. |
| 5,374,936 A | 12/1994 | Feng |
| 5,379,451 A | 1/1995 | Nakagoshi |
| 5,381,338 A | 1/1995 | Wysocki |
| 5,384,825 A | 1/1995 | Dillard et al. |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,396,545 A | 3/1995 | Nair et al. |
| 5,396,558 A | 3/1995 | Ishiquro et al. |
| 5,398,190 A | 3/1995 | Wortham |
| 5,404,580 A | 4/1995 | Simpson et al. |
| 5,406,614 A | 4/1995 | Hara |
| 5,408,513 A | 4/1995 | Busch et al. |
| 5,408,519 A | 4/1995 | Pierce et al. |
| 5,408,682 A | 4/1995 | Ranner et al. |
| 5,412,726 A | 5/1995 | Nevoux et al. |
| 5,418,537 A | 5/1995 | Bird |
| 5,423,076 A | 6/1995 | Westergren |
| 5,430,759 A | 7/1995 | Yokev et al. |
| 5,432,841 A | 7/1995 | Rimer |
| 5,434,789 A | 7/1995 | Fraker |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy |
| 5,469,497 A | 11/1995 | Pierce et al. |
| 5,470,233 A | 11/1995 | Fuchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman et al. |
| 5,488,563 A | 1/1996 | Chazelle |
| 5,497,149 A | 3/1996 | Fast |
| 5,502,761 A | 3/1996 | Duncan et al. |
| 5,506,893 A | 4/1996 | Buscher et al. |
| 5,508,931 A | 4/1996 | Snider |
| 5,509,056 A | 4/1996 | Ericsson et al. |
| 5,513,243 A | 4/1996 | Kage |
| 5,515,287 A | 5/1996 | Hakoyama |
| 5,517,555 A | 5/1996 | Amadon et al. |
| 5,517,559 A | 5/1996 | Hayashi et al. |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,550,897 A | 8/1996 | Seiderman |
| 5,552,772 A | 9/1996 | Janky |
| 5,555,286 A | 9/1996 | Tendler |
| 5,568,119 A | 10/1996 | Schipper |
| 5,570,416 A | 10/1996 | Kroll |
| 5,574,648 A | 11/1996 | Pilley |
| 5,577,100 A | 11/1996 | McGregor et al. |
| 5,579,372 A | 11/1996 | Astrom |
| 5,579,376 A | 11/1996 | Kennedy, III et al. |
| 5,583,918 A | 12/1996 | Nakagawa |
| 5,586,175 A | 12/1996 | Hogan et al. |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |

(56) References Cited

U.S. PATENT DOCUMENTS

| | | |
|---|---|---|
| 5,610,972 A | 3/1997 | Emery et al. |
| 5,614,890 A | 3/1997 | Fox |
| 5,615,116 A | 3/1997 | Gudat |
| 5,621,793 A | 4/1997 | Bednarek et al. |
| 5,625,669 A | 4/1997 | McGregor et al. |
| 5,628,051 A | 5/1997 | Salin |
| 5,633,912 A | 5/1997 | Tsoi |
| 5,640,447 A | 6/1997 | Fonseca |
| 5,673,306 A | 9/1997 | Amadon |
| 5,682,600 A | 10/1997 | Salin |
| 5,692,037 A | 11/1997 | Friend |
| 5,719,918 A | 2/1998 | Serbetciouglu |
| 5,722,067 A | 2/1998 | Fougnies et al. |
| 5,732,346 A | 3/1998 | Lazaridis |
| 5,740,534 A | 4/1998 | Ayerst |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,778,313 A | 7/1998 | Fougnies |
| 5,787,357 A | 7/1998 | Salin |
| 5,790,636 A | 8/1998 | Marshall |
| 5,793,859 A | 8/1998 | Matthews |
| 5,794,142 A | 8/1998 | Vanttila et al. |
| 5,797,091 A | 8/1998 | Clise |
| 5,797,094 A | 8/1998 | Houde et al. |
| 5,797,096 A | 8/1998 | Lupien |
| 5,802,492 A | 9/1998 | Delorme |
| 5,806,000 A | 9/1998 | Vo |
| 5,815,816 A | 9/1998 | Isumi |
| 5,822,700 A | 10/1998 | Hultt |
| 5,826,185 A | 10/1998 | Wise et al. |
| 5,828,740 A | 10/1998 | Khuc |
| 5,850,599 A | 12/1998 | Seiderman |
| 5,854,975 A | 12/1998 | Fougnies et al. |
| 5,856,974 A | 1/1999 | Gervais |
| 5,889,473 A | 3/1999 | Wicks |
| 5,905,736 A | 5/1999 | Ronen et al. |
| 5,920,821 A | 7/1999 | Seazholtz |
| 5,930,701 A | 7/1999 | Skog |
| 5,940,755 A | 8/1999 | Scott |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,974,054 A | 10/1999 | Couts |
| 5,974,133 A | 10/1999 | Fleischer |
| 5,978,685 A | 11/1999 | Laiho |
| 5,983,091 A | 11/1999 | Rodriguez |
| 5,987,323 A | 11/1999 | Huotari |
| 5,999,811 A | 12/1999 | Molne |
| 6,029,062 A | 2/2000 | Hanson |
| 6,035,025 A | 3/2000 | Hanson |
| 6,038,444 A | 3/2000 | Schipper |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen |
| 6,073,004 A | 6/2000 | Balachandran |
| 6,073,015 A | 6/2000 | Berggren et al. |
| 6,075,982 A | 6/2000 | Donovan et al. |
| 6,081,508 A | 6/2000 | West |
| 6,101,378 A | 8/2000 | Barabash |
| 6,115,458 A | 9/2000 | Taskett |
| 6,119,014 A | 9/2000 | Alperovich et al. |
| 6,122,503 A | 9/2000 | Daly |
| 6,122,520 A | 9/2000 | Want |
| 6,138,158 A | 10/2000 | Boyle et al. |
| 6,148,197 A | 11/2000 | Bridges |
| 6,148,198 A | 11/2000 | Anderson |
| 6,149,353 A | 11/2000 | Nilsson |
| 6,157,823 A | 12/2000 | Fougnies et al. |
| 6,169,891 B1 | 1/2001 | Gorham et al. |
| 6,173,181 B1 | 1/2001 | Losh |
| 6,181,935 B1 | 1/2001 | Gossman |
| 6,188,752 B1 | 2/2001 | Lesley |
| 6,195,543 B1 | 2/2001 | Granberg |
| 6,198,431 B1 | 3/2001 | Gibson |
| 6,199,045 B1 | 3/2001 | Giniger |
| 6,205,330 B1 | 3/2001 | Winbladh |
| 6,208,854 B1 | 3/2001 | Roberts |
| 6,208,870 B1 | 3/2001 | Lorello et al. |
| 6,223,046 B1 | 4/2001 | Hamill-Keays et al. |
| 6,226,529 B1 | 5/2001 | Bruno |
| 6,249,680 B1 | 6/2001 | Wax |
| 6,249,744 B1 | 6/2001 | Morita |
| 6,266,614 B1 | 7/2001 | Alumbaugh |
| 6,289,373 B1 | 9/2001 | Dezonno |
| 6,314,108 B1 | 11/2001 | Ramasubramani |
| 6,317,594 B1 | 11/2001 | Gossman |
| 6,321,257 B1 | 11/2001 | Kotola et al. |
| 6,327,479 B1 | 12/2001 | Mikkola |
| 6,335,968 B1 | 1/2002 | Malik |
| 6,356,630 B1 | 3/2002 | Cai et al. |
| 6,370,373 B1 | 4/2002 | Gerth |
| 6,373,930 B1 | 4/2002 | McConnell et al. |
| 6,381,316 B2 | 4/2002 | Joyce et al. |
| 6,381,535 B1 | 4/2002 | Durocher et al. |
| 6,393,014 B1 | 5/2002 | Daly et al. |
| 6,393,269 B1 | 5/2002 | Hartmaier et al. |
| 6,396,913 B1 | 5/2002 | Perkins, III |
| 6,397,054 B1 | 5/2002 | Hoirup et al. |
| 6,397,055 B1 | 5/2002 | McHenry et al. |
| 6,421,707 B1 | 7/2002 | Miller |
| 6,442,257 B1 | 8/2002 | Gundlach |
| 6,456,852 B2 | 9/2002 | Bar et al. |
| 6,473,622 B1 | 10/2002 | Meuronen |
| 6,483,907 B1 | 11/2002 | Wong et al. |
| 6,487,180 B1 | 11/2002 | Borgstahl |
| 6,487,602 B1 | 11/2002 | Thakker |
| 6,490,450 B1 | 12/2002 | Batni et al. |
| 6,496,690 B1 | 12/2002 | Cobo et al. |
| 6,505,046 B1 | 1/2003 | Baker |
| 6,507,589 B1 | 1/2003 | Ramasubramani |
| 6,512,930 B2 | 1/2003 | Sandegren |
| 6,526,335 B1 | 2/2003 | Treyz et al. |
| 6,526,351 B2 | 2/2003 | Whitham |
| 6,529,593 B2 | 3/2003 | Nelson |
| 6,529,732 B1 | 3/2003 | Vainiomaki et al. |
| 6,587,688 B1 | 7/2003 | Chambers et al. |
| 6,609,004 B1 | 8/2003 | Morse |
| 6,621,810 B1 | 9/2003 | Leung |
| 6,654,786 B1 | 11/2003 | Fox et al. |
| 6,667,688 B1 | 12/2003 | Menard et al. |
| 6,677,894 B2 | 1/2004 | Sheynblat |
| 6,690,940 B1 | 2/2004 | Brown |
| 6,728,353 B1 | 4/2004 | Espejo |
| 6,728,635 B2 | 4/2004 | Hamada et al. |
| 6,731,943 B1 | 5/2004 | McCormick |
| 6,782,258 B2 | 8/2004 | Ung |
| 6,868,074 B1 | 3/2005 | Hanson |
| 6,879,835 B2 | 4/2005 | Greene |
| 6,915,138 B2 | 7/2005 | Kraft |
| 6,952,575 B1 | 10/2005 | Countryman |
| 6,970,869 B1 | 11/2005 | Slaughter et al. |
| 6,985,742 B1 | 1/2006 | Giniger |
| 6,993,325 B1 | 1/2006 | Waesterlid |
| 7,020,480 B2 | 3/2006 | Coskun |
| 7,072,665 B1 | 7/2006 | Blumberg |
| 7,110,773 B1 | 9/2006 | Wallace |
| 7,120,418 B2 | 10/2006 | Herajarvi |
| 7,123,874 B1 | 10/2006 | Brennan |
| 7,127,264 B2 | 10/2006 | Hronek |
| 7,130,383 B2 | 10/2006 | Naidoo et al. |
| 7,180,415 B2 | 2/2007 | Bankert et al. |
| 7,224,696 B2 | 5/2007 | Bouleros |
| 7,240,108 B2 | 7/2007 | Smith |
| 7,260,836 B2 | 8/2007 | Roskind |
| 7,317,705 B2 | 1/2008 | Hanson |
| 7,328,031 B2 | 2/2008 | Kraft |
| 7,356,328 B1 | 4/2008 | Espejo |
| 7,386,588 B2 | 6/2008 | Mousseau |
| 7,392,038 B1 | 6/2008 | Ratschunas |

(56) References Cited

U.S. PATENT DOCUMENTS

| | | |
|---|---|---|
| 7,409,428 B1 | 8/2008 | Brabec |
| 7,437,348 B1 | 10/2008 | Wyett |
| 7,480,915 B2 | 1/2009 | Costa Requena et al. |
| 7,486,641 B2 | 2/2009 | Reddy |
| 7,522,182 B2 | 4/2009 | Bang |
| 7,577,431 B2 | 8/2009 | Jiang |
| 7,864,927 B2 | 1/2011 | Loizeaux |
| 8,014,945 B2 | 9/2011 | Cooper |
| 8,200,291 B2 | 6/2012 | Steinmetz |
| 8,300,529 B2 | 10/2012 | Strub |
| 2001/0006889 A1 | 7/2001 | Kraft |
| 2001/0031641 A1 | 10/2001 | Ung et al. |
| 2001/0034224 A1 | 10/2001 | McDowell et al. |
| 2001/0040949 A1 | 11/2001 | Blonder |
| 2002/0013153 A1 | 1/2002 | Wilcock |
| 2002/0068546 A1 | 6/2002 | Plush |
| 2002/0093435 A1 | 7/2002 | Baron |
| 2002/0098851 A1 | 7/2002 | Walczak |
| 2002/0103762 A1 | 8/2002 | Lopez |
| 2002/0133568 A1 | 9/2002 | Smith et al. |
| 2002/0143946 A1 | 10/2002 | Crosson |
| 2002/0168986 A1 | 11/2002 | Lau et al. |
| 2002/0183072 A1 | 12/2002 | Steinbach |
| 2003/0008661 A1 | 1/2003 | Joyce |
| 2003/0017832 A1 | 1/2003 | Anderson |
| 2003/0022664 A1 | 1/2003 | Goldstein |
| 2003/0040300 A1 | 2/2003 | Bodic |
| 2003/0051041 A1 | 3/2003 | Kalavade |
| 2003/0058096 A1 | 3/2003 | Shteyn |
| 2003/0086422 A1 | 5/2003 | Klinker et al. |
| 2003/0105864 A1 | 6/2003 | Mulligan |
| 2003/0119525 A1 | 6/2003 | Rajkotia |
| 2003/0120826 A1 | 6/2003 | Shay |
| 2003/0125045 A1 | 7/2003 | Riley |
| 2003/0155413 A1 | 8/2003 | Kovesdi |
| 2003/0163730 A1 | 8/2003 | Roskind |
| 2003/0186710 A1 | 10/2003 | Muhonen |
| 2003/0187803 A1 | 10/2003 | Pitt |
| 2003/0193967 A1 | 10/2003 | Fenton |
| 2003/0210656 A1 | 11/2003 | Biacs |
| 2004/0030659 A1 | 2/2004 | Gueh |
| 2004/0078340 A1 | 4/2004 | Evans |
| 2004/0103431 A1 | 5/2004 | Davenport et al. |
| 2004/0110524 A1 | 6/2004 | Takano |
| 2004/0176104 A1 | 9/2004 | Arcens |
| 2004/0176123 A1 | 9/2004 | Chin |
| 2004/0196858 A1 | 10/2004 | Tsai |
| 2004/0199614 A1 | 10/2004 | Shenfield et al. |
| 2004/0203756 A1 | 10/2004 | Lin |
| 2004/0209594 A1 | 10/2004 | Naboulsi |
| 2005/0003803 A1 | 1/2005 | Buckley |
| 2005/0004968 A1 | 1/2005 | Mononen |
| 2005/0020287 A1 | 1/2005 | Pohutsky et al. |
| 2005/0048948 A1 | 3/2005 | Holland et al. |
| 2005/0064884 A1 | 3/2005 | Dumont |
| 2005/0101338 A1 | 5/2005 | Kraft |
| 2005/0132060 A1 | 6/2005 | Mo |
| 2005/0135569 A1 | 6/2005 | Dickinson |
| 2005/0141522 A1 | 6/2005 | Kadar |
| 2005/0164721 A1 | 7/2005 | Yeh |
| 2005/0176445 A1 | 8/2005 | Qu |
| 2005/0186974 A1 | 8/2005 | Cai |
| 2005/0190789 A1 | 9/2005 | Salkini |
| 2005/0239480 A1 | 10/2005 | Kim |
| 2005/0261012 A1 | 11/2005 | Weiser |
| 2005/0265536 A1 | 12/2005 | Smith |
| 2005/0273442 A1 | 12/2005 | Bennett |
| 2005/0282518 A1 | 12/2005 | D'Evelyn |
| 2006/0030337 A1 | 2/2006 | Nowak |
| 2006/0053197 A1 | 3/2006 | Yoshimura |
| 2006/0058951 A1 | 3/2006 | Cooper |
| 2006/0063536 A1 | 3/2006 | Kim |
| 2006/0094403 A1 | 5/2006 | Norefors |
| 2006/0109960 A1 | 5/2006 | D'Evelyn |
| 2006/0148415 A1 | 7/2006 | Hamalainen |
| 2006/0183460 A1 | 8/2006 | Srinivasan et al. |
| 2006/0194595 A1 | 8/2006 | Myllynen |
| 2006/0225090 A1 | 10/2006 | Shim et al. |
| 2006/0274696 A1 | 12/2006 | Krishnamurthi |
| 2006/0281470 A1 | 12/2006 | Shi |
| 2007/0021098 A1 | 1/2007 | Rhodes |
| 2007/0037586 A1 | 2/2007 | Kim |
| 2007/0101411 A1 | 5/2007 | Babi |
| 2007/0110076 A1 | 5/2007 | Brouwer |
| 2007/0136132 A1 | 6/2007 | Weiser |
| 2007/0243885 A1 | 10/2007 | Shim |
| 2008/0081646 A1 | 4/2008 | Morin |
| 2008/0098225 A1 | 4/2008 | Baysinger |
| 2008/0268769 A1 | 10/2008 | Brown |
| 2009/0029675 A1 | 1/2009 | Steinmetz |
| 2010/0076767 A1 | 3/2010 | Vieri |
| 2010/0120412 A1 | 5/2010 | Tang |
| 2010/0167691 A1 | 7/2010 | Howarter et al. |
| 2011/0009086 A1 | 1/2011 | Poremba |
| 2011/0064205 A1 | 3/2011 | Boni |
| 2011/0109468 A1 | 5/2011 | Hirschfeld |
| 2011/0151852 A1 | 6/2011 | Olincy |

FOREIGN PATENT DOCUMENTS

| | | |
|---|---|---|
| SE | PCT/SE98/00992 | 5/1998 |
| SE | PCT/SE99/00875 | 5/1999 |
| UA | 2308528 | 12/1995 |

OTHER PUBLICATIONS

Bond, "Cellular Carriers Use Prepaid Programs to Reach Untapped Markets," Billing World, Mar. 1997, pp. 14-17.

Robbrock, The Intelligent Network—Changing the Face of Telecommunications, IEEE, Jan. 1991, pp. BCG 21207-BCG 21220.

MultiMedia Publishing Corp., "Prepaid Cellular and Prepaid Wireless Market Report and Forecast 1997-2002," sales literature, undated.

Nextlink, "Introducing a New Prepaid Telephone Service from NEXTLINK," sales literature, undated.

Open Development Corp., "openMedia Cellular Prepaid," sales literature.

Tecore, Inc., "Pre-Paid Cellular," sales literature, Mar. 25, 1997, pp. 1-4.

Open Mobile Alliance, user Plane Location Protocol Candidate Version 1.0, OMA-TS-ULP-V1_0- 20060127-C, Jan. 27, 2006, pp. 1-66.

Sable et al., Intelligent Networking: Network Systems, AT&T Technical Journal, Summer 1991, vol. 3-4, pp. 1-84.

The Power of Mobile Unified Messaging; Siemans and Comverse to Demonstrate WAP-Based Messaging Applications on Live GBRS System, Comverse, Feb. 2000.

Open Mobile Alliance, Secure User Plane Location Architecture Candidate Version 1.0, OMA-AD-SUPL-V1_0-20060127-C, Jan. 27, 2006, pp. 1-180.

Le-Pond Chin, The Study of the Interconnection of GSM Mobile Communication System Over IP Based Network, IEEE, pp. 2219-2223.

PREPAID SHORT MESSAGING

This application is a continuation of U.S. application Ser. No. 13/373,193, filed Nov. 8, 2011, entitled "Prepaid Short Messaging"; which in turn is a continuation of Ser. No. 12/292,606, filed Nov. 21, 2008, entitled "Prepaid Short Messaging," now U.S. Pat. No. 8,060,429; which in turn is a continuation of U.S. application Ser. No. 12/222,861, filed Aug. 18, 2008, entitled "Prepaid Short Messaging," now U.S. Pat. No. 7,853,511; which in turn is a continuation of Ser. No. 09/790,979, filed Feb. 23, 2001, entitled "Prepaid Short Messaging," now U.S. Pat. No. 7,428,510; which claims priority from U.S. Provisional Patent Application 60/185,053 to Titus et al., filed Feb. 25, 2000, entitled "Prepaid Messaging", the entirety of all of which is are expressly incorporated herein by reference.

BACKGROUND OF THE INVENTION

1. Field of the Invention

This invention relates generally to short messaging systems. More particularly, it relates to prepaid billing of short message services.

2. Background of Related Art

Prepaid voice services exist. In a prepaid voice scenario, as part of the establishment of a telephone call, a service queries a database for a particular subscriber to determine if there is at least a given amount of funds available to pay for a call about to be made. In such a prepaid voice scenario, the ultimate cost of the desired telephone call is not known at that time, because the caller may not know the exact length of time that they would like to speak. Thus, a 'minimum' cost of the telephone call given the location of the called party (e.g., for a 3 minute call) may be determined, and compared to the remaining balance in the caller's service account. If there is sufficient money remaining to pay for at least the minimum cost of the telephone call (e.g., to pay for a minimum 3 minute call), then the call is allowed to go through and be established.

In the conventional prepaid voice system, when the subscriber's account has been exhausted or nearly exhausted, the subscriber is initially warned about the dwindling account balance. Ultimately, if the account balance is not replenished in time, the telephone call will be terminated due to lack of funds.

Conventionally, when a called party does not answer a telephone call, a voice message may be left in a voice mailbox. However, since the telephone call was not answered, there typically is no tariffing or cost applied to the subscriber's account. While this may be advantageous to the subscriber, the wireless carrier service does not recover costs with respect to that voice message.

Nevertheless, while prepayment for voice telephone calls has been accomplished, existing technologies have not applied the concepts of pre-payment to the world of short messaging (e.g., Internet messaging delivery services) as have prepaid wireless voice & calling cards. The lack of pre-payment service for messaging increases the possibility for fraudulent billing with respect to payment collections, particularly with respect to the high demand for wireless information services.

There is a need for an architecture and method for providing prepaid messaging services.

SUMMARY OF THE INVENTION

In accordance with the principles of the present invention, a method and apparatus for handling a prepaid messaging service comprises tariffing a short message before transmission. An account database is queried to determine if an account corresponding to an addressed party of the short message has sufficient funds to pay for transmission of the short message. If the account has sufficient funds, the short message is transmitted.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a prepaid messaging solution which uses open networking standards (e.g., TCP/IP) and which supports pre-payment of enhanced Internet messaging services. The disclosed prepaid architectures and methods accurately determine if a subscriber has sufficient account balance to deliver a complete short message, prior to delivery of the message. The short message may be prevented from being delivered (either at the source end or at the destination end) if insufficient funds are in the subscriber's account.

Short messaging architectures are significantly different from mere telephone systems, and thus prepaid short messaging is quite different from prepaid voice telephone calls. Accordingly, the implementation of prepaid accounting for short messaging encounters different issues than does prepaid accounting for voice telephone calls.

For instance, voice telephone calls are conventionally billed or tariffed based on a length of the telephone call. However, such billing or tariffing is not useable for short message cost recovery because most short messages can be transmitted in a blink of an eye, or at the most just a few seconds. Thus, prepaid voice telephone techniques and apparatus provide no workable solution to tariffing for short messages.

In a short messaging system, the length of the short message is known at the time of transmission (unlike voice telephone calls which are indefinite in nature, and must be 'cut off' when account balances dwindle). For instance, the approximate total number of ASCII type characters will be known, or the approximate total size of a transferred file may be known. Thus, in accordance with the principles of the present invention, short messages may be tariffed based on the substance of the short message being transferred.

This is significantly different from that encountered in conventional prepaid voice telephone systems, where the costing of a particular voice telephone call can be finalized only after completion of the voice telephone call. It is only after someone in the voice telephone call has hung up that the final length of the telephone call (and thus the final total cost of the telephone call) can be known. Thus, either prepaid voice telephone call accounts run the risk of being overdrawn to a negative balance, and/or the subscriber (and their called party) may be subject to embarrassing and inconvenient disconnects in an ongoing telephone call corresponding to the point at which the account balance becomes drawn down to $0.00.

Conventionally, wireless & Internet Messaging services have been capable of billing only on a postpaid basis. The present invention enables a wireless carrier or Internet service provider to accept pre-payment of enhanced short messaging services, including but not limited to short messages originated by a wireless device (e.g., Short Message Service Mobile Originated (SMSC MO)), short messages terminated by a wireless device, i.e., sent to a wireless device (SMSC Mobile Terminated (SMSC MT)), and IRC and other chat messages. In addition, Internet Push information service short messages may be prepaid (e.g., stock quotes, e-mail, weather, sports scores, etc.), as can individual & network game cards, and/or Wireless Application Protocol (WAP) services.

A U.S. patent application disclosing an architecture and method for providing prepaid voice call management in an intelligent network is disclosed in a co-owned application, U.S. Appl. No. 09/533,805, entitled "PREPAID CALL MANAGEMENT IN INTELLIGENT NETWORK", by Elizabeth Countryman, Timothy J. Lorello, Mark Titus, and Dara Ung, the entirety of which is expressly incorporated herein by reference. Conventionally, wireless and Internet short messaging services have been capable of billing, if at all, only on a postpaid basis. A prepaid short messaging service in accordance with the principles of the present invention enables a wireless carrier or Internet service provider to accept pre-payment of both simple (i.e., short text messages) as well as enhanced (e.g., WAP applications, HTML documents, etc.) short messaging services.

In accordance with the principles of the present invention, real-time billing can be implemented for the delivery of short messages, allowing the prepayment of short messaging services. The real-time billing can debit subscriber balances for service usage, and can suspend short messaging services for a particular subscriber when the subscriber's account balance is depleted. Preferably, the subscriber can continue their short messaging service by depositing additional funds into their account via a suitable replenishment method.

For instance, a user may access a direct interface to a credit card authorization center to debit funds from a credit card and apply the same to their short messaging account. Replenishment may alternatively be accomplished over the Internet or via a suitable SMSC mobile originated message. Voice recognition techniques may be implemented to facilitate easy fund transfers into a users short messaging account.

A prepaid short messaging service in accordance with the principles of the present invention can be implemented as a standalone service, or may be bundled with other applications, e.g., with a prepaid voice telephone call wireless application.

Figure 1:
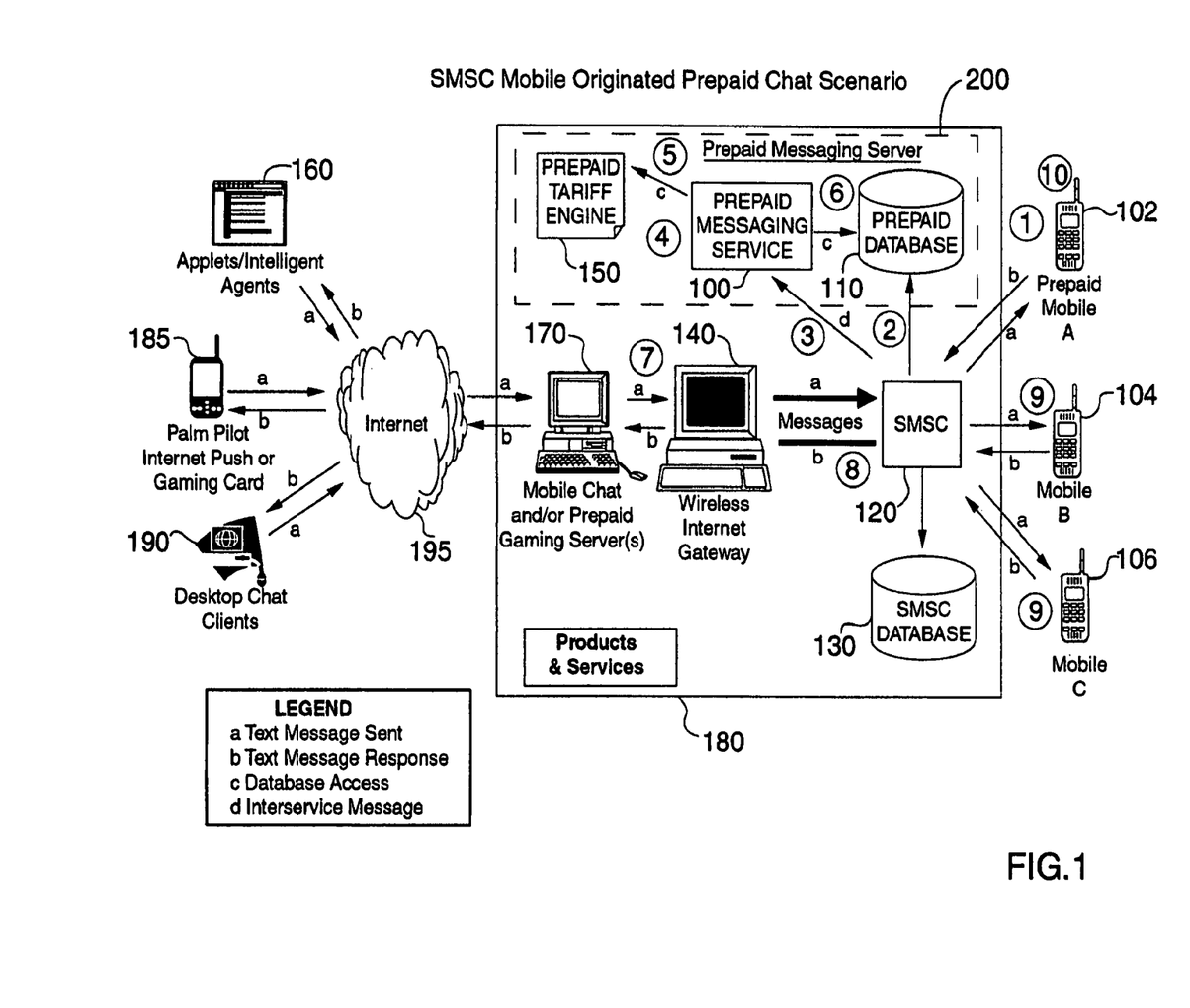
FIG. 1 shows an exemplary prepaid SMSC mobile originated mobile chat scenario in an implementation including a prepaid messaging system controller (SMSC) mobile originated (MO) chat, in accordance with the principles of the present invention.

FIG. 1 shows an exemplary prepaid SMSC mobile originated mobile chat scenario in an implementation including a prepaid messaging system controller (SMSC) mobile originated (MO) chat, in accordance with the principles of the present invention. While FIG. 1 shows the particular example of a mobile originated chat message, it is to be understood that the prepaid messaging system and methods in accordance with the principles of the present invention are also applicable to many other message types.

A U.S. patent application disclosing an architecture and method for providing Internet chat capability to mobile units is described in a co-owned application, U.S. application Ser. No. 09/525,926, entitled "MOBILE ORIGINATED INTERNET RELAY CHAT", by Richard A. Smith, Orville A. Pike, and Johanna Wilson, the entirety of which is expressly incorporated herein by reference.

As shown in FIG. 1, a prepaid short messaging server 200, in communication with a short messaging service center (SMSC) 120. The SMSC 120 includes, e.g., an SMSC database 130, and accesses the Internet 195 via an appropriate wireless Internet gateway 140. A suitable wireless Internet gateway 140 is shown and described in co-pending U.S. application Ser. No. 09/630,762 to Richard Smith, filed Aug. 2, 2000, entitled "Wireless Internet Gateway", the entirety of which is explicitly incorporated herein by reference.

By way of example, short messages may be passed between, e.g., Applets/Intelligent agents 160, personal digital assistants (PDAs) such as a PalmPilot™ Internet Push or Gaming card device 185, and Desktop chat clients 190.

In the given example, a chat server and/or gaming server 170 is shown within the network of the prepaid service provider. Of course, the chat server 170 may be external to the service provider's network and accessible via the Internet 195.

The prepaid short messaging server 200 comprises a prepaid short messaging account database 110, a prepaid short messaging service application 100, and a prepaid short messaging service rating engine (i.e., prepaid tariff engine) 150.

The prepaid tariff engine 150 preferably supports data driven rating structures that can be modified at run time.

The prepaid tariff engine 150 is preferably extensible over a TCP/IP network (e.g., the Internet 195), and supports remote interaction with the Short Message Service Center (SMSC) 120 & web chat servers (e.g., 170) for the purpose of applying a real-time billing charge for each message.

The prepaid tariff engine 150 preferably supports tariffing based on the following message types: Short Message Service Mobile Originated (SMSC MO), SMSC Mobile Terminated (SMSC MT), Prepaid Internet Chat Rooms/Messages, Prepaid Internet Push information service messages (e.g., stock quotes, e-mail, weather, sports scores, etc.), Prepaid Individual & Network Game cards/applications, and Wireless Application Protocol (WAP) services.

A prepaid short messaging service in accordance with the principles of the present invention preferably supports service provider creation of subscriber classes of service that define and uniquely identify subscriber rate and/or tariffing plans used to apply real-time billing charges for sending or receiving of messages. Moreover, the prepaid short messaging service preferably supports Internet web page access to subscriber's relating to their short messaging account balances and status maintained in the prepaid short messaging database 110 of the prepaid messaging server 200.

While the prepaid messaging server 200 is shown comprising the prepaid tariff engine 150, prepaid messaging service application 100 and prepaid short messaging account database 110, each of these elements may be external to the prepaid messaging server 200, or combined with another element of the service provider's network, in accordance with the principles of the present invention.

Prepaid delivery of a chat message is shown in sequential steps in FIG. 1.

In particular, in step 1, using a wireless handset device (i.e., mobile phone, palm pilot, etc.) Mobile A 102, provisioned with prepaid chat service, registers into a chat session & composes a short message service mobile originated (SMSC MO) message targeted for all chat room participants. In this example chat room participants are Mobile B 104, Mobile C 106 and the Desktop Chat Client 190 as indicated in FIG. 1. Note in this example Mobiles B & C (104, 106), and the Desktop Chat client 190 are non-prepaid accounts.

In step 2, the SMSC application 120 receives an SMSC mobile originated message from Mobile A 102, validates the identity of Mobile A 102, then queries the prepaid short messaging account database 110 to determine if sufficient balance exists to deliver the message originated by Mobile A 102. If the Mobile A 102 account balance is not sufficient, then proceed to step 10, otherwise if sufficient balance exists in Mobile A's prepaid account, the SMSC 120 forwards Mobile A's message to the chat server 170 (step 8), and notifies the prepaid short messaging service application 100 with a delivery receipt message (step 3).

In step 3, the prepaid messaging service 100 receives an interservice message from the SMSC application 120.

In step 4, the prepaid messaging service application 100 processes the delivery receipt message received from SMSC 120. The message contents may include, e.g., Mobile A's mobile identification number (MIN), Time of delivery, Time of Arrival, Message Status, and/or Message Type.

In step 5, the prepaid messaging service 100 invokes the prepaid tariff engine 150 to determine the appropriate message billing based upon, including but not limited to, the following exemplary criteria: Flat rate per message, message count (e.g., 10 messages @ $5.00), character count (e.g., $0.01/char.), Time of Day, Day of Week (i.e., peak & non-peak hours), and/or mobile location (i.e., network point code).

In step 6, the prepaid messaging service 100 debits the account of Mobile A 102 based upon the billing rate as computed by the prepaid tariff engine 150.

In step 7, the chat server 170 processes Mobile A's message, determines group members in the current chat session, then forwards a "broadcast mobile terminated message" request to the SMSC 120 for delivery to Mobile B 104 & Mobile C 106. The chat server 170 delivers the message to the desktop chat client 190.

In step 8, the SMSC 120 stores and forwards the broadcast message for delivery to Mobile B 104 & Mobile C 106 (step 5).

In step 9, Mobiles B & C (104, 106) receive the message originated from Mobile A 102.

In step 10, the SMSC 102 has determined that Mobile A's account balance is insufficient to deliver the originated message. The SMSC 120 then discards the originated message and launches an SMSC mobile terminated message for Mobile A 102. The message contents inform Mobile A 102 that his/her prepaid account balance is too low and that Mobile A 102 needs to recharge the account in order to continue service.

In step 11, the same process would apply for the SMSC mobile terminated message delivery scenario where Mobiles B & C (104, 106) are prepaid subscribers.

The prepaid short messaging service 100 preferably interfaces with a Short Message Service Center 120 and/or Web servers (e.g., 140, 170) to provide real-time message billing based on pre-payment. The prepaid short messaging service 100 prevents delivery of messages for conditions where the subscriber balance is insufficient.

The prepaid short messaging service 100 preferably interfaces with a Short Message Service Center 120 and/or Web servers (140, 170) to provide real-time and/or periodic notifications to subscribers of insufficient balance conditions.

The prepaid short messaging service 100 preferably interfaces with a Short Message Service Center 120 and/or Web servers 140, 170 to buffer subscriber messages for a variable period of time and inform subscribers of pending messages. The application preferably suspends subscriber service until their account balance has been sufficiently replenished.

The prepaid short messaging account database 110 may be managed by the relevant service provider, e.g., by a wireless service or an Internet Service Provider (ISP)

Figure 2:
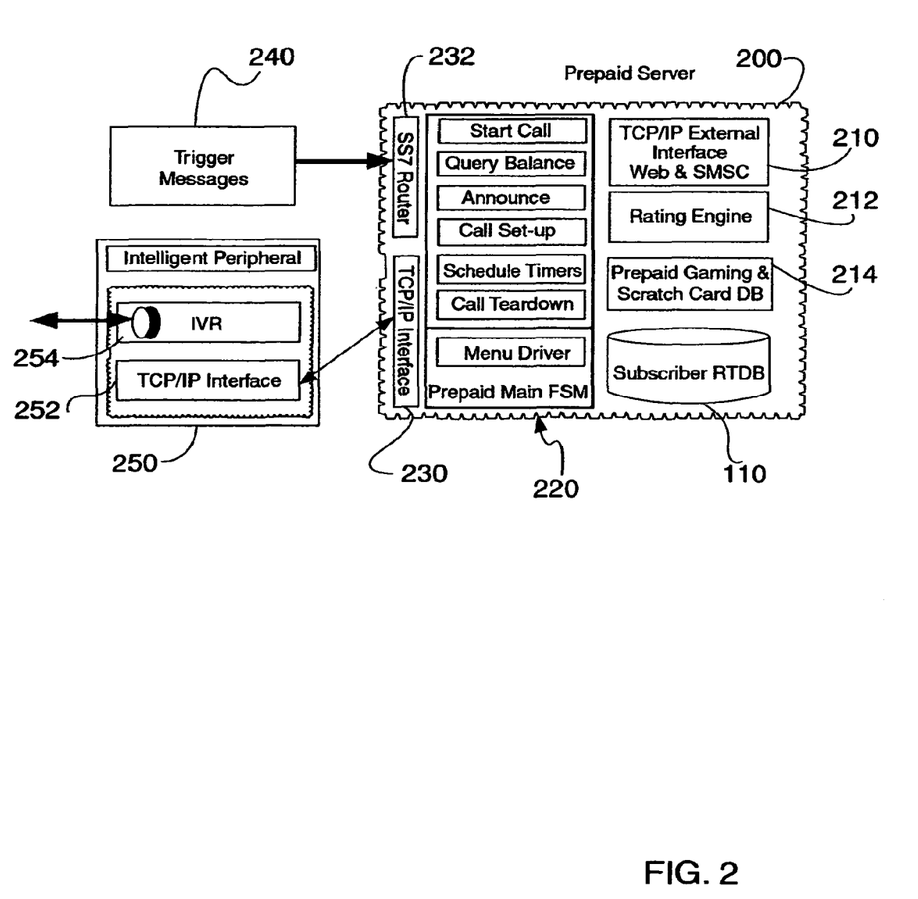
FIG. 2 shows a block diagram of exemplary modules in a prepaid messaging system providing a prepaid messaging service, in accordance with the principles of the present invention.

FIG. 2 shows in more detail the prepaid server shown in FIG. 1.

In particular, as shown in FIG. 2, the prepaid service architecture is distributed and extensible over a local or wide area network. The prepaid short messaging server 200 contains the subscriber data and server processing logic required for basic call processing, communication with the Web & SMSC servers, message tariffing (i.e., rating engine) and subscriber balance updates. The Intelligent Peripheral 250 contains service logic responsible for providing replenishment functions via the Integrated Voice Response system 254.

The present invention relates to use by, e.g., wireless carriers, Internet service providers (ISPs), information content delivery services/providers, portal sites for mobile-terminated hosting of chat groups, Internet chat session hosts, and/or Internet gaming hosts. The principles of the invention may be used in intelligent networks including, e.g., short message servicing centers, prepaid and web gateway applications, prepaid paging systems, prepaid Internet access, prepaid gaming cards, and/or prepaid Internet chat sessions.

The prepaid tariff engine 150 preferably supports tariffing based on message-based (and not time based) criteria.

For example, the prepaid tariff engine 150 may base the fee charged to the subscriber based on, e.g., a flat rate per message, message count (e.g., 10 messages @ $5.00), character count (e.g., $0.01/char.), Time of Day, Day of Week (i.e., peak & non-peak hours), mobile location (i.e., network point code).

In addition, or alternatively, the rates for delivery of the short message may be based on its type, e.g., distinguishing rates between Short Message Service Mobile Originated (SMSC MO) messages, SMSC Mobile Terminated (SMSC MT) messages, Internet chat room messages, and/or information service messages (e.g., stock quotes, e-mail, weather, sports scores, gaming, Wireless Application Protocol (WAP) messages, etc.).

Preferably, delivery of short messages is prevented if the prepaid short messaging service application 100 determines, from query of the prepaid short messaging database 110, that insufficient funds remain for delivery of a given short message. In such a case, a real-time short message notification may be provided to the subscriber indicating the non-delivery of the short message the insufficiency of an account balance in a suitable short message format. Additionally, or alternatively, the short message notifications may be delivered periodically and/or upon demand.

Figure 3:
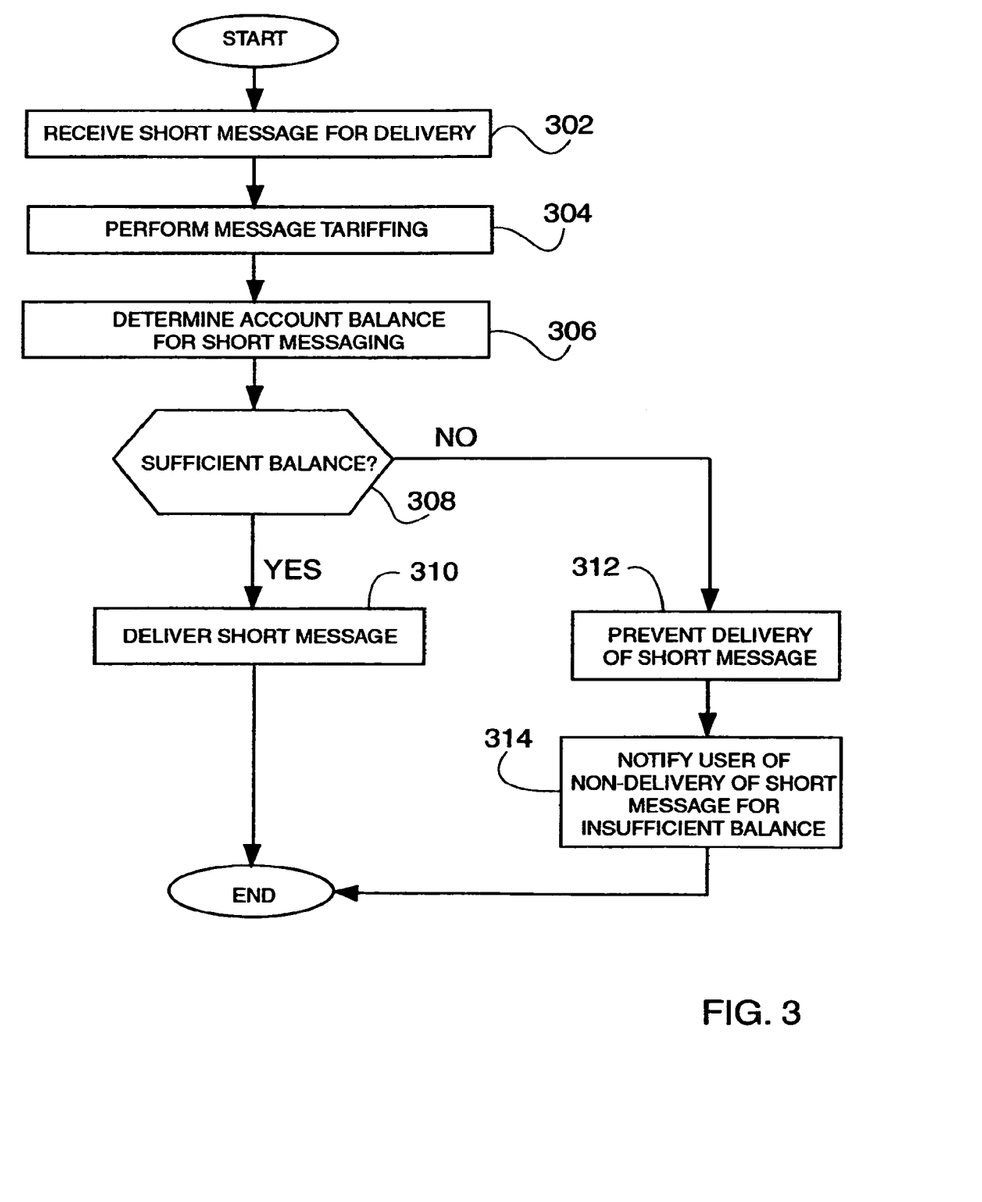
FIG. 3 shows an exemplary process of implementing prepaid messaging services, in accordance with the principles of the present invention.

FIG. 3 shows an exemplary process of implementing prepaid messaging services, in accordance with the principles of the present invention.

In particular, as shown in step 302 of FIG. 3, a short message is received for delivery.

In step 304, tariffing of the short message is performed in the prepaid tariff engine 150.

In step 306, the balance of the sender's account is determined, e.g., from query of a subscriber short messaging account database 110. Note that in short messaging, the exact cost of transmitting the message is known up front, and thus the risk of overdrawing a particular account balance is reduced or eliminated.

In step 308, if a sufficient subscriber account balance remains, the short message is delivered as depicted in step 310. If sufficient subscriber account balance does not remain, the delivery of the short message may be prevented, as depicted in step 312. It is preferred that in this case the subscriber be notified, e.g., by short messaging such as a text message, that the particular short message was not delivered due to a determination of an insufficient subscriber account balance.

Figure 4:
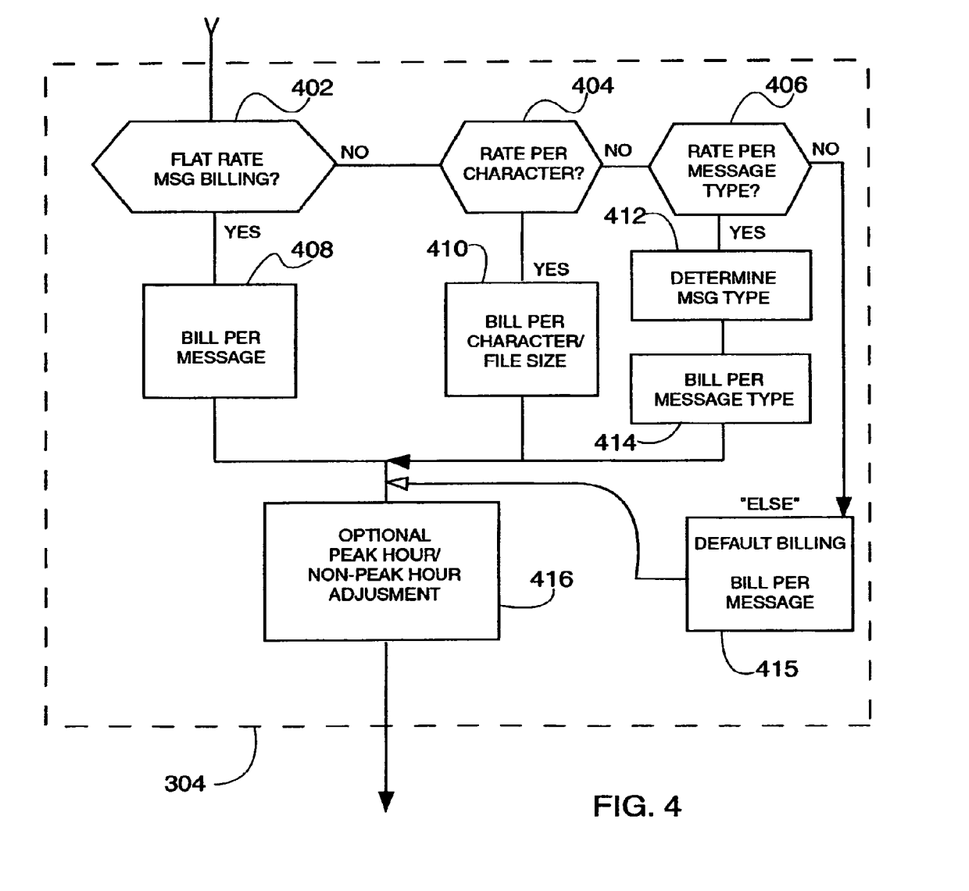
FIG. 4 shows the step of performing message tariffing shown in FIG. 3 in more detail.

FIG. 4 shows the step of performing message tariffing 304 shown in FIG. 3 in more detail.

In particular, as shown in FIG. 4, tariffing may be based, e.g., on flat rate message billing (step 402), a particular rate given per character in a text file or for a particular length of a given file (step 404), and/or based on a particular message type (step 406). The particular tariffing technique may be configurable by the service provider and/or selectable by the subscriber, e.g., by choice of a particular service plan.

If flat rate message billing 402 is enabled, a subject short message is logged and the subscriber's account in the prepaid account database 110 is appropriately debited a fixed amount per message, as shown in step 408.

If, on the other hand, a rate is affixed in accordance with the number of text characters and/or the length of a particular file (e.g., a binary file), then a particular cost is associated with the subject short message, as depicted in step 410.

If a rate is applied based on a particular type of short message, then the message type is determined in step 412, and a cost associated with that particular message type (e.g., as determined from a look-up file) as shown in step 414.

Step 415 ensures billing is performed by providing a default billing mechanism.

As shown in optional step 416, adjustments may be made to the costing assigned in prior steps due to peak hour usage. For instance, a 20% premium may be added to the costs associated with the transmission of a particular short message based on the time of submission for transmission.

The prepaid short messaging system preferably supports direct interface to a credit card authorization center associated with the service provider's merchant identification number, and allows replenishment over the Internet. The direct interface may be implemented via a secure socket connection over the Internet 195 to an authorized Internet server.

The prepaid short messaging service application 100 preferably supports indirect interface to a credit card authorization center associated with the service provider's merchant identification number, and allows replenishment via an SMSC mobile originated message. For instance, in such a scenario, a mobile subscriber typically has a signature on file with the service provider, as well as authorized spending limits for mobile replenishment transactions. The direct interface may be implemented via a secure socket connection over the Internet 195 to an authorized Internet server.

The prepaid short messaging service application 100 preferably supports a prepaid subscriber replenishing their account via credit card at their discretion, e.g., by dialing an Interactive Voice Response Unit (IVRU 254 shown in FIG. 2). Using this technique, a subscriber is prompted to either speak or manually enter their credit card information (e.g., number and expiration date), and the transaction is then processed automatically.

Of course, the principles of the present invention may encourage and/or implement transmission of short messages during non-peak or otherwise desirable times to reduce costs.

While the invention has been described with reference to the exemplary embodiments thereof, those skilled in the art will be able to make various modifications to the described embodiments of the invention without departing from the true spirit and scope of the invention.

What is claimed is:

1. A method of tariffing a text message, comprising:
   providing a text message for tariff after transmission completion from a sending mobile device and before receipt by a recipient mobile device associated with said text message;
   querying a physical account database to determine that a prepaid account corresponding to said recipient mobile device has prepaid for delivery of said text message;
   permitting reduction of a prepaid parameter of said prepaid account prior to delivery of said text message;
   if said prepaid account is determined to be sufficiently prepaid, routing said text message to said recipient mobile device; and
   if said prepaid account is determined to be insufficiently prepaid, preventing delivery of said text message to said recipient mobile device, and once said prepaid account is sufficient permitting delivery of subsequent text messages associated with said prepaid account.

2. The method of tariffing a text message according to claim 1, wherein:
   said prepaid parameter is a number of prepaid messages.

3. The method of tariffing a text message according to claim 1, wherein:
   said prepaid parameter is a prepaid monetary value.

4. The method of tariffing a text message according to claim 1, further comprising:
   sending an unsuccessful message to said recipient mobile device when said delivery of said text message is prevented.

5. The method of tariffing a text message according to claim 1, wherein:
   said prepaid account is tariffed on a tariff platform external to a routing platform for routing said text message to said recipient mobile device.

6. The method of tariffing a text message according to claim 1, wherein:
   said prepaid account corresponds to said sending mobile device.

7. The method of tariffing a text message according to claim 1, wherein:
   said prepaid account corresponds to said recipient mobile device.

8. The method of tariffing a text message according to claim 1, further comprising:
   routing said text message from a physical mobile servicing center (MSC).

9. The method of tariffing a text message according to claim 1, wherein:
   said tariffing is different for peak and non-peak times.

10. The method of tariffing a text message according to claim 1, wherein:
    said tariffing is different for different types of text messages.

11. The method of tariffing a text message according to claim 10, wherein said different types of text messages include at least one of:
    a mobile terminated message;
    a mobile originated message; and
    an Internet Relay Chat (IRC) message.

12. The method of tariffing a text message according to claim 1, wherein:

said tariffing is different based on a location of said sending mobile device.

13. The method of tariffing a text message according to claim 12, wherein:
said location is determined based on a network point code.

14. The method of tariffing a text message according to claim 1, wherein:
said tariffing is different based on a location of said recipient mobile device.

15. The method of tariffing a text message according to claim 14, wherein:
said location is determined based on a network point code.

16. The method of tariffing a text message according to claim 1, further comprising:
automatically transmitting said text message.

* * * * *